C. McELROY.
Device for Detaching Horses from Carriages.
No. 89,159.                                      Patented April 20, 1869.
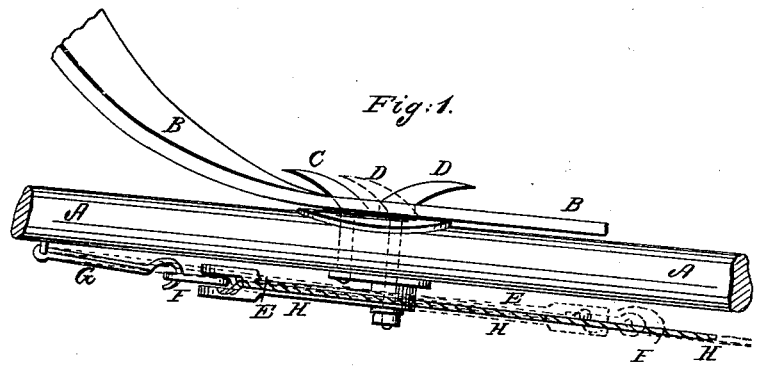
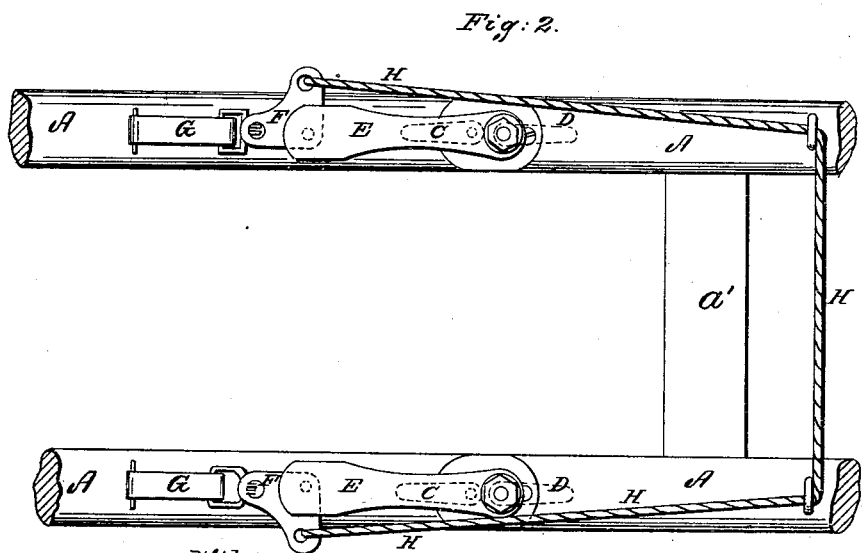
Witnesses:
John F. Brooks
J. Armstrong McGrath
Inventor:
C. McElroy
per Munn & Co.
Attorneys

C. McELROY, OF NEW BALTIMORE, MICHIGAN.

Letters Patent No. 89,159, dated April 20, 1869.

DEVICE FOR DETACHING HORSES FROM CARRIAGES.

The Schedule referred to in these Letters Patent and making part of the same.

*To all whom it may concern:*

Be it known that I, C. McELROY, of New Baltimore, in the county of Macomb, and State of Michigan, have invented a new and useful Improvement in Attaching and Detaching Horses to and from Carriages; and I do hereby declare that the following is a full, clear, and exact description thereof, which will enable others skilled in the art to make and use the same, reference being had to the accompanying drawing, forming part of this specification, in which—

Figure 1 is a side view of a portion of a pair of shafts, to which my improvement has been attached.

Figure 2 is an under side view of the same.

Similar letters of reference indicate corresponding parts.

My invention has for its object to furnish an improvement in the manner of attaching horses to carriages, by means of which the horse can be easily and quickly attached and instantly detached, when required, which shall be safe and reliable, and at the same time dispense with the use of the ordinary traces and whiffle-trees; and It consists in the construction and combination of the device as hereinafter more fully described.

A represents the thills, or shafts, the rear parts of which are connected by a cross-bar, $a'$, in the ordinary manner.

The forward parts of the thills A are supported by thill straps in the ordinary manner.

B are straps, the forward ends of which are buckled to the hames-tugs, hames, or collar, and the rear end of which is buckled to the breeching-ring.

In the strap B, at or near its middle point, is formed a slot to receive the coupling-hooks C D.

If desired, the slot in the strap B may have a metallic ring, of the proper size and form, inserted in it, to strengthen the strap and prevent wear.

C is a hook, made strong, and with a strong shoulder.

The shank of the hook C is made square, and passes through a square hole in the thill A, to which it is firmly secured, in such a position that the point of the hook may project toward the forward end of the thill.

The hook D is made exactly like the hook C, except that it has a round shank, which passes through a round hole formed through the thill A, just in the rear of the hook C.

The part of the thills that is weakened by the holes for the hooks C D is strengthened by two iron straps, or plates, formed to fit the upper and lower sides of the thills, or by a metallic band passing around the thills.

The lower end of the shank of the hook D is made square, to pass through the square hole in the end of the arm E, and has a screw-thread cut upon its extreme end, to receive the nut, by means of which the said arm is secured in place.

The forward end of the arm E is slotted, and in the said slot is pivoted one arm of the three-arm plate F.

To one of the other arms of the plate F is pivoted one end of the rubber, or equivalent spring G, the other end of which is attached to the forward part of the under side of the thill.

By this construction, by turning the arm E half around, the hook D will be turned so as to point in the same direction as the hook C, allowing the strap B to slip from or be conveniently placed upon the hooks C D.

The arm E can be operated by hand, or by a cord or wire.

In the latter case, the ends of the wires, or cords H are attached to the third arm of the three-armed plates F, and, passing back through guides, or keepers, are connected to each other beneath the cross-bar $a'$ of the thills A.

At the centre of the cross-bar $a'$, a single cord, or strap may be attached to the cords, or wires G, extending back to the carriage, and secured in such a position that it may be conveniently reached and operated by the driver to instantly detach the horse when required.

Having thus described my invention,

What I claim as new, and desire to secure by Letters Patent, is—

1. The hooks C D, arm E, and spring G, or their, or either of their equivalents, in combination with each other and with the thills A, substantially as herein shown and described, and for the purpose set forth.

2. The strap B, constructed as described, in combination with the hooks C D or equivalent support, substantially as herein shown and described, and for the purpose set forth.

3. The combination of the cord, or wire H with the arms E, springs G, and hooks C D, substantially as herein shown and described, and for the purpose set forth.

C. McELROY.

Witnesses:
J. McELROY,
M. M. SANDERS.